United States Patent [19]
Beland

[11] Patent Number: 6,111,732
[45] Date of Patent: Aug. 29, 2000

[54] APPARATUS AND METHOD FOR DETECTING GROUND FAULT

[75] Inventor: Robert Beland, St. Marthe sur le Lac, Canada

[73] Assignee: Transfotec International Ltee, Saint-Eustache, Canada

[21] Appl. No.: 09/065,144

[22] Filed: Apr. 23, 1998

[51] Int. Cl.[7] .................................................. H02H 3/00
[52] U.S. Cl. ............................................................ 361/42
[58] Field of Search ................................. 361/42, 47, 84, 361/91, 100; 315/119, 225

[56] References Cited

U.S. PATENT DOCUMENTS

| | | | |
|---|---|---|---|
| 3,973,171 | 8/1976 | Howell | 317/18 |
| 4,001,646 | 1/1977 | Howell | 317/18 |
| 4,020,394 | 4/1977 | Potash | 361/45 |
| 4,149,113 | 4/1979 | Sammis | 315/219 |
| 4,286,193 | 8/1981 | King, Jr. et al. | 315/175 |
| 4,563,719 | 1/1986 | Nilssen | 361/45 |
| 4,613,934 | 9/1986 | Pacholok | 363/131 |
| 5,004,955 | 4/1991 | Nilssen | 315/119 |
| 5,089,752 | 2/1992 | Pacholok | 315/307 |
| 5,241,443 | 8/1993 | Efantis | 361/36 |
| 5,349,273 | 9/1994 | Pacholok | 315/307 |
| 5,387,845 | 2/1995 | Nilssen | 315/209 |
| 5,394,065 | 2/1995 | Rimmer | 315/277 |
| 5,424,893 | 6/1995 | Francis, Jr. et al. | 361/45 |
| 5,448,443 | 9/1995 | Muelleman | 361/111 |
| 5,530,321 | 6/1996 | Sears | 315/283 |
| 5,680,286 | 10/1997 | Pacholok | 361/42 |

*Primary Examiner*—Ronald W. Leja
*Attorney, Agent, or Firm*—Wolf, Greenfield & Sacks, P.C.

[57] ABSTRACT

An electrical power system for a cold cathode tube includes a high-voltage transformer with a primary side connected to a power supply and a secondary side connected to a cold cathode tube and includes a ground fault detector. The ground fault detector includes a resistive path, a detection circuit, an isolation circuit, and a stop latch. The resistive path is connected to the secondary side of the high-voltage transformer and is arranged to provide a ground fault path to ground fault current. The detection circuit is connected to the resistive path and is constructed and arranged to provide an output representing a fault detection signal. The isolation circuit is connected to the detection circuit and is constructed and arranged to isolate the fault detection signal from the primary side of the high voltage transformer. The stop latch has an input connected to the isolation circuit and an output connected to the power supply and is constructed and arranged to generate an inhibition signal for inhibiting operation of the power supply.

18 Claims, 9 Drawing Sheets

APPARATUS AND METHOD FOR DETECTING GROUND FAULT

BACKGROUND OF THE INVENTION

1. Field of the Invention

This invention relates generally to gas discharge devices, and more particularly to a ground fault detector for power supplies used with cold cathode tubes.

2. Discussion of the Related Art

Cold cathode tubes, also known as neon tubes or gas discharge devices, use an ionization process to provide light. As depicted in FIG. 1, a cold cathode tube 12 is typically a vacuum-sealed glass tube 14 that is filled with inert gas 16 such as argon or neon. Tube 14 is fitted at each end with a metal electrode 18A and 18B to provide an electrical contact with inert gas 16. Pumping outlet 20 allows inert gas 16 to be sealed in tube 14.

The tubes may be fabricated in many shapes. Diameters of 6 mm to 18 mm are typical. As shown in FIG. 2, a tube may also be formed by a cavity 24 formed inside a glass material such as glass plate 22, again with electrodes 18A and 18B and outlet 20.

In operation, electrodes 18A and 18B are connected to a high voltage source. When connected to a high voltage source, the ionization process is initiated in which the atoms of the inert gas 16 are stimulated, and the tube will then glow with light from the energy spectrum that depends upon the gas type. For example, a neon tube will glow ruby red, mercury vapor will glow blue-green, and argon will glow pale blue.

Once ionized, a constant current is maintained through the inert gas at a voltage referred to as a running voltage. This constant current is typically in the range of 10 to 120 mA. In order to ionize the gas initially, a striking voltage of approximately 1.5 times the running voltage is provided to the electrodes.

The striking and running voltages are typically directly proportional to the tube length, and are typically in the range of 500–8000 Vrms for tubes having a length of approximately one foot to a length of several feet. The luminous intensity of inert gas 16 is directly proportional to the current that flows through inert gas 16.

An example of a known power supply for cold cathode tubes is depicted in FIG. 3. A high voltage converter 30 receives an input voltage $V_{in}$, and generates an output voltage $V_{out}$. $V_{in}$ may be an AC supply such as 110 VAC or 220 VAC for household or commercial applications or a DC supply such as 12V for automotive applications. The output voltage $V_{out}$ is provided to cold cathode tube 12 by high voltage cables 32. Typically, $V_{out}$ has a square shape waveform, and represents an open circuit voltage in the range of 1,000V to 15,000V. Due to the potential safety hazards, it is desirable that the high voltage cables 32 be as short as possible. This consideration limits the size and weight of the high voltage converter 30, since in order to keep the high voltage cables 32 short, the high voltage converter 30 is typically mounted as close as possible to cathode tube 12. Also for safety reasons, high voltage cables 32 are often installed in a conduit. The installation of the high voltage cables requires special consideration and must often adhere to strict safety codes. Furthermore, if the high voltage wires must pass through a wall, then a special insulator is required for passing the wires through the wall in order to comply with safety requirements.

Another characteristic of cold cathode tubes is that inert gas 16 within cathode tube 12 creates an apparent negative resistance. As inert gas 16 ionizes, the resistance as sensed by high voltage converter 30 decreases, causing the current within the tube to rapidly increase when power is initially applied to cathode tube 12. This rapid increase of current will cause instability in a tuned circuit within high voltage converter 30, which is providing power to cathode tube 12. The rapid current increase may in some instances damage the tuned circuit if implemented as a solid state power oscillator. Therefore, it has been necessary to provide a current limiting inductor in series with cathode tube 12, between the tube 12 and high voltage converter 30, in order to regulate the load current. However, such an arrangement causes RFI (Radio Frequency Interference) and EMI (Electromagnetic Interference) difficulties, because of the resulting unbalance between the load current limiting inductor and the tuned circuit providing the high voltage. Due to the harmonics that would be generated otherwise, the tuned circuit must be physically located close to the load current limiting inductor; this limits the options where to physically arrange high voltage converter 30.

In conventional circuits that include cold cathode tubes, current transformers are often used to sense a current imbalance caused by a ground leakage current returning to a source through an unintended ground circuit path. A protection device may isolate the circuit including the cold cathode tube from a power supply when a fault in the circuit is detected.

FIG. 4 shows a conventional circuit for sensing ground fault current. A bridge rectifier 40 connects an AC line voltage to an inverter 42 through inputs 43. Inverter 42 is connected to primary ground 45, which may be zero volts. Outputs 44 of inverter 42 drive the primary side of a transformer T1. Cathode tube L is connected to the secondary side of transformer T1 through outputs 51 and 52 of transformer T1. Midpoint M of transformer T1 is connected to secondary ground 53, for example, earth ground, through the primary side (P) of current transformer CT. The secondary side (S) of current transformer CT is connected to the shunt resistor $R_{s1}$, which in turn is connected at one end to primary ground 45 and to an input 50 of comparator 48. Comparator 48 also receives threshold voltage $V_{th}$. An output 49 of comparator 48 is connected to input 46 of inverter 42. In addition, a ground fault condition in the circuit may be represented by, for example, $R_{F1}$ and $R_{F2}$, which are shown connected to secondary ground 53. A ground fault current which develops may flow back into the secondary side of transformer T1 through outputs 51 and 52, and may flow through midpoint M. Any ground fault current flowing through midpoint M may also leak back into the primary side P1 of transformer T1 through primary ground 45 connected to current transformer CT.

A method of operating the circuit described in FIG. 4 includes connecting the primary side (P) of the current transformer CT to a midpoint M of high voltage transformer T1. Current through the secondary side (S1 and S2) of transformer T1 is sensed by current transformer CT through the connection of the high voltage transformer midpoint M to secondary ground 53. Therefore, any ground fault current flowing in the circuit, as represented by $R_{F1}$ or $R_{F2}$, flows from midpoint M through the primary side of the current transformer to secondary ground 53. A secondary current is dependent on the turns ratio of the current transformer CT. For example, for a 1 to 1 ratio of the transformer CT, substantially the same amount of fault current flows into a resistor $R_{s1}$, connected across a secondary side of the transformer CT, as the fault current flowing through the primary side of current transformer CT. A voltage across this shunt resistor $R_{s1}$ is measured and sent to comparator 48 to detect a ground fault condition. Comparator 48 compares the voltage $V_{s1}$ across $R_{s1}$ to a threshold voltage $V_{th}$. For example, when the $V_{s1}$ voltage exceeds threshold voltage $V_{th}$, due to a ground fault, the output of comparator 48 is used to send a signal to inverter 42 to inhibit the operation of inverter 42.

This technique has several drawbacks. For instance, the current transformer CT is relatively large in order to pass a frequency in the range of 20–30 kHz of the high voltage inverter with a minimum amount of loss. The relatively large current transformer is needed to achieve low loss at the inverter fundamental frequency since the coil impedance is in parallel with the shunt resistor $R_{s1}$ and causes an error. Furthermore, the magnetizing current of the core produces an additional error. To minimize these errors the core cross section and the number of turns must be made large enough as to cause a small error of the measured current. The large transformer adds size and often adds cost to the above-described fault detector. In addition, the parameters of the transformer CT must be carefully taken into account in order to set an accurate threshold voltage $V_{th}$, since any loss in the transformer CT results in an inaccurate detection of ground fault current.

SUMMARY OF THE INVENTION

The present invention is a ground fault detector or a method for detecting a ground fault in a power supply system for a cold cathode tube.

In one aspect, a ground fault detector for a cold cathode tube comprises a resistive path, a detection circuit, an isolation circuit, and a stop latch. The resistive path is connected to a secondary side of a high-voltage transformer providing power to a cold cathode tube, wherein the resistive path is arranged to provide a ground fault path to ground fault current. The detection circuit, connected to the resistive path, is constructed and arranged to provide an output representing a fault detection signal upon detecting the fault current. The isolation circuit, connected to the detection circuit, is constructed and arranged to isolate the fault detection signal from a primary side of the high voltage transformer. The stop latch includes an input connected to the isolation circuit and an output connected to a power supply arranged to supply power to the primary side of the high-voltage transformer.

In another aspect, a power supply system for a cold cathode tube comprises a high-voltage transformer, a power supply and a ground fault detector. The high-voltage transformer includes a primary side and a secondary side connected to a cold cathode tube. The power supply is connected to the primary side of the high-voltage transformer. The ground fault detector includes a resistive path, a detection circuit, an isolation circuit, and a latch circuit. The resistive path provides a ground fault path to ground fault current. The detection circuit provides an output representing a fault detection signal upon detecting the fault current. The isolation circuit isolates the fault detection signal from the primary side of the high voltage transformer. The latch circuit inhibites the invertor power supply upon receiving the signal from the isolation circuit.

Preferred embodiment of these aspects may include one or more of the following features:

The power supply may be an inverter power supply.

The resistive path is connected to the mid-point or the end-point of the secondary side of the high voltage transformer.

The resistive path includes a first resistor. The detection circuit includes a second resistor connected in parallel to the resistive path, a capacitor connected in parallel to the second resistor and a trigger diode connected to the second resistor and connected to the isolation circuit.

The isolation circuit includes a pulse transformer connected to the stop latch and connected to the detection circuit.

The resistive path includes a first resistor. The detection circuit includes a second resistor connected in parallel to the resistive path, a capacitor connected in parallel to the second resistor, and a Zener diode connected to the isolation circuit and connected to the isolation circuit.

The isolation circuit includes an opto coupler connected to the stop latch and connected to the detection circuit.

The isolation circuit senses a ground fault condition and sets a trip point for a power supply driving the primary side of the high voltage transformer.

The electric power supply system may include a rectifier connected to receive AC voltage and constructed to provide DC voltage to the power supply.

In another aspect, a method for detecting a ground fault in a power supply for a cold cathode tube includes the steps of generating a power signal; supplying the power signal to a primary side of a high-voltage transformer and receiving high voltage power by a cold cathode tube from a secondary of the high-voltage transformer; providing a resistive ground path for ground fault current from the secondary side of the high voltage transformer; detecting a fault condition based on the ground fault current and generating a fault detection signal; isolating the fault detection signal from the secondary side and generating an inhibition signal; and the inhibiting generation of the power signal in response to the inhibition signal.

Advantageously, the ground fault detector is a relatively small and practical device connected to a power supply for a cold cathode tube. The ground fault detector does not require a current transformer that passes the fundamental frequency of the current waveform without significant losses. The ground fault detector establishes the trip point directly into the mid-point or the end-point of the high voltage transformer to ground, and stops the power supply once the fault current threshold is reached in the ground circuit.

BRIEF DESCRIPTION OF THE DRAWINGS

Other features and advantages of the present invention shall appear from the following description of exemplary embodiments made with reference to the appended drawings, in which.

DETAILED DESCRIPTION

The present invention will be more completely understood through the following detailed description which should be read in conjunction with the attached drawings in which similar reference numbers indicate similar structures.

Figure 1:
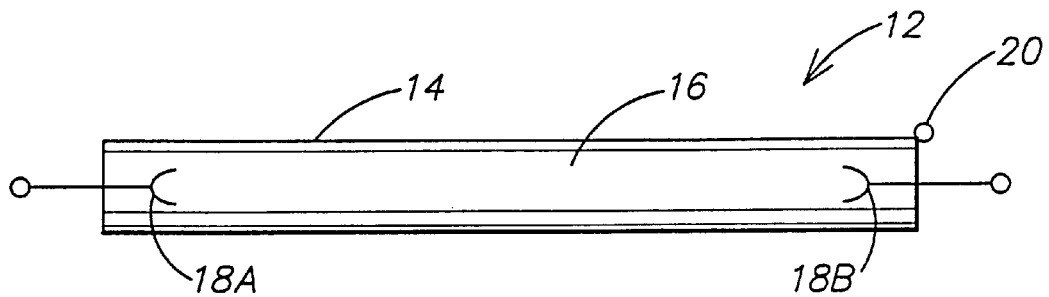
FIG. 1 is a diagram of a cold cathode tube.
Figure 2:
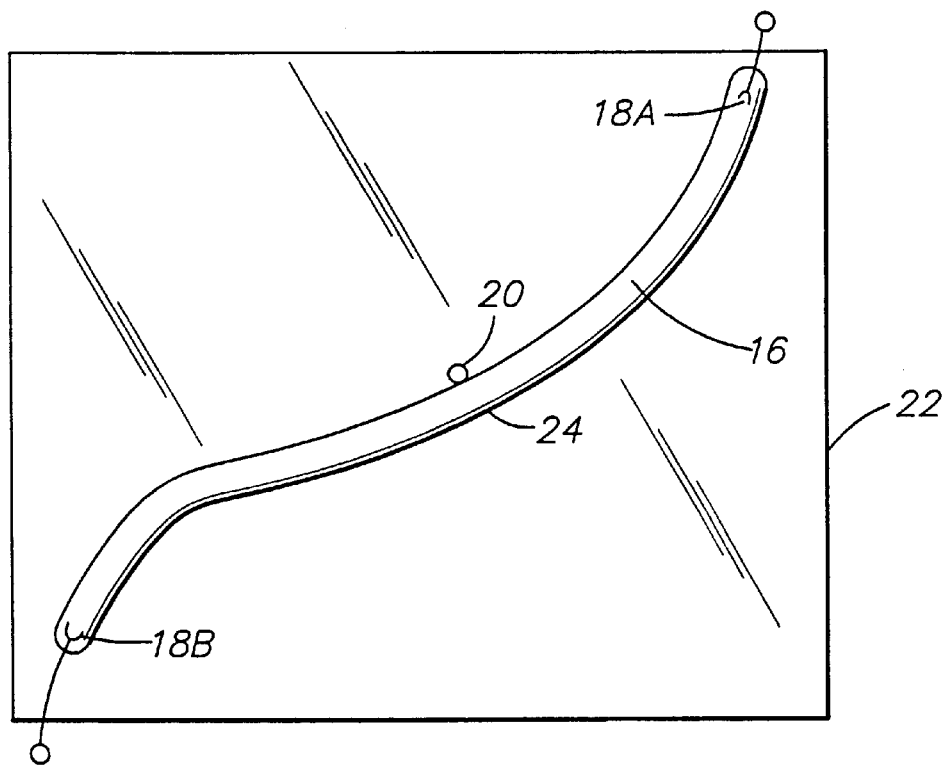
FIG. 2 is a diagram of an alternate assembly to FIG. 1, in which the cold cathode tube is formed in a cavity of a plate of glass.
Figure 3:
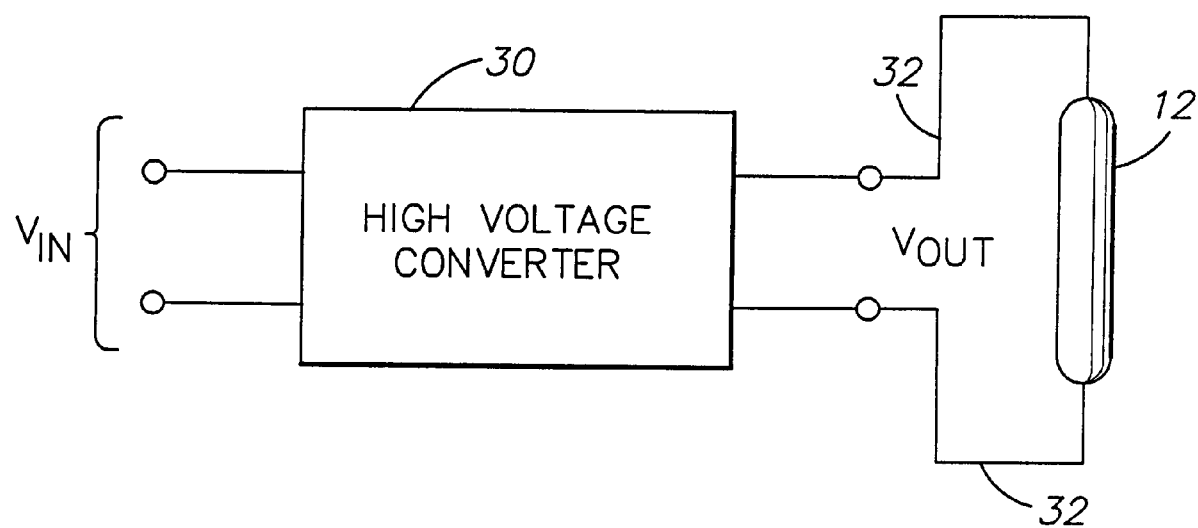
FIG. 3 is a diagram of a known high voltage converter for supplying electrical power to a tube such as those shown in FIGS. 1 and 2.
Figure 4:
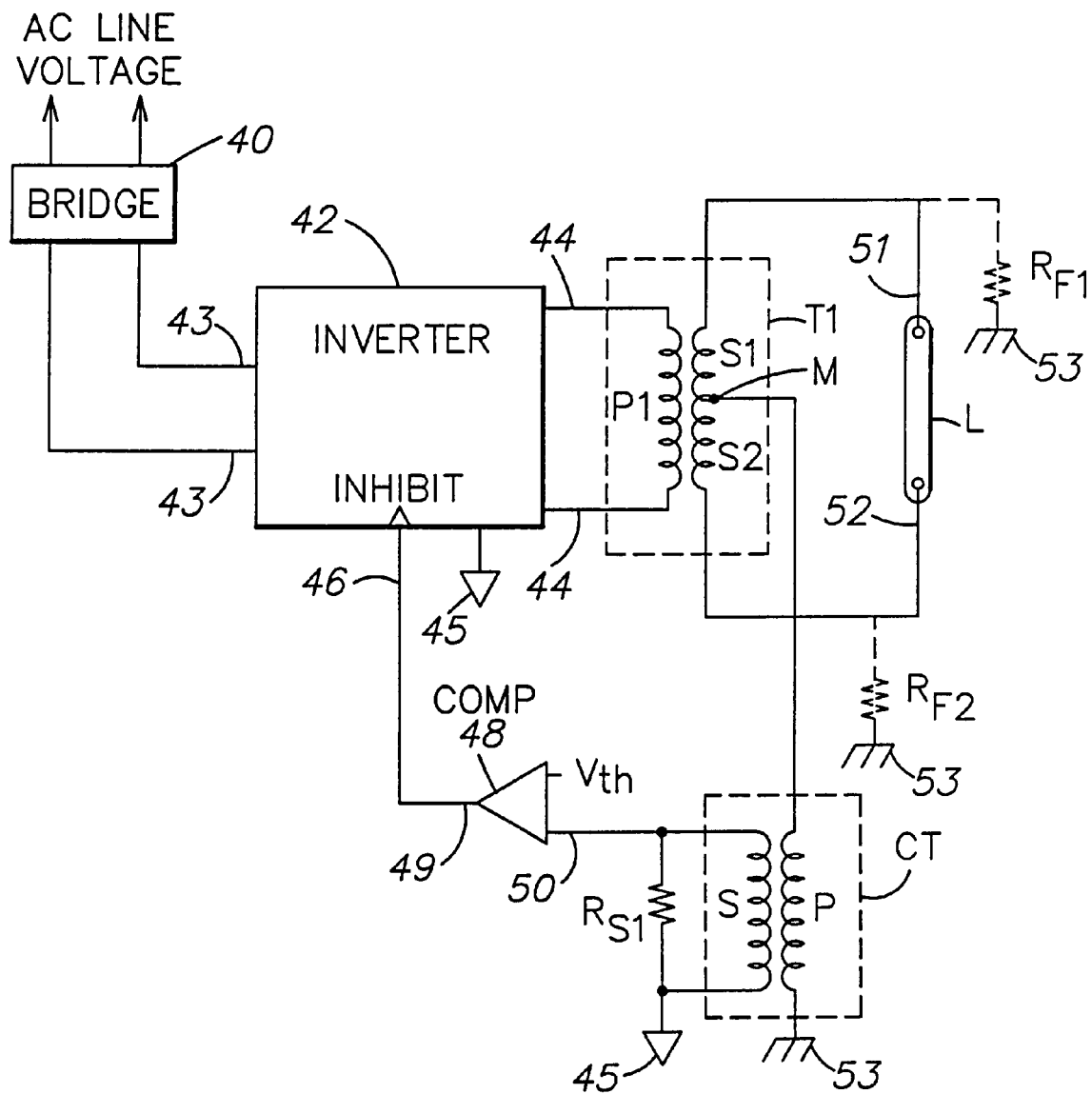
FIG. 4 is a circuit diagram of a conventional system for sensing ground fault current.
Figure 5:
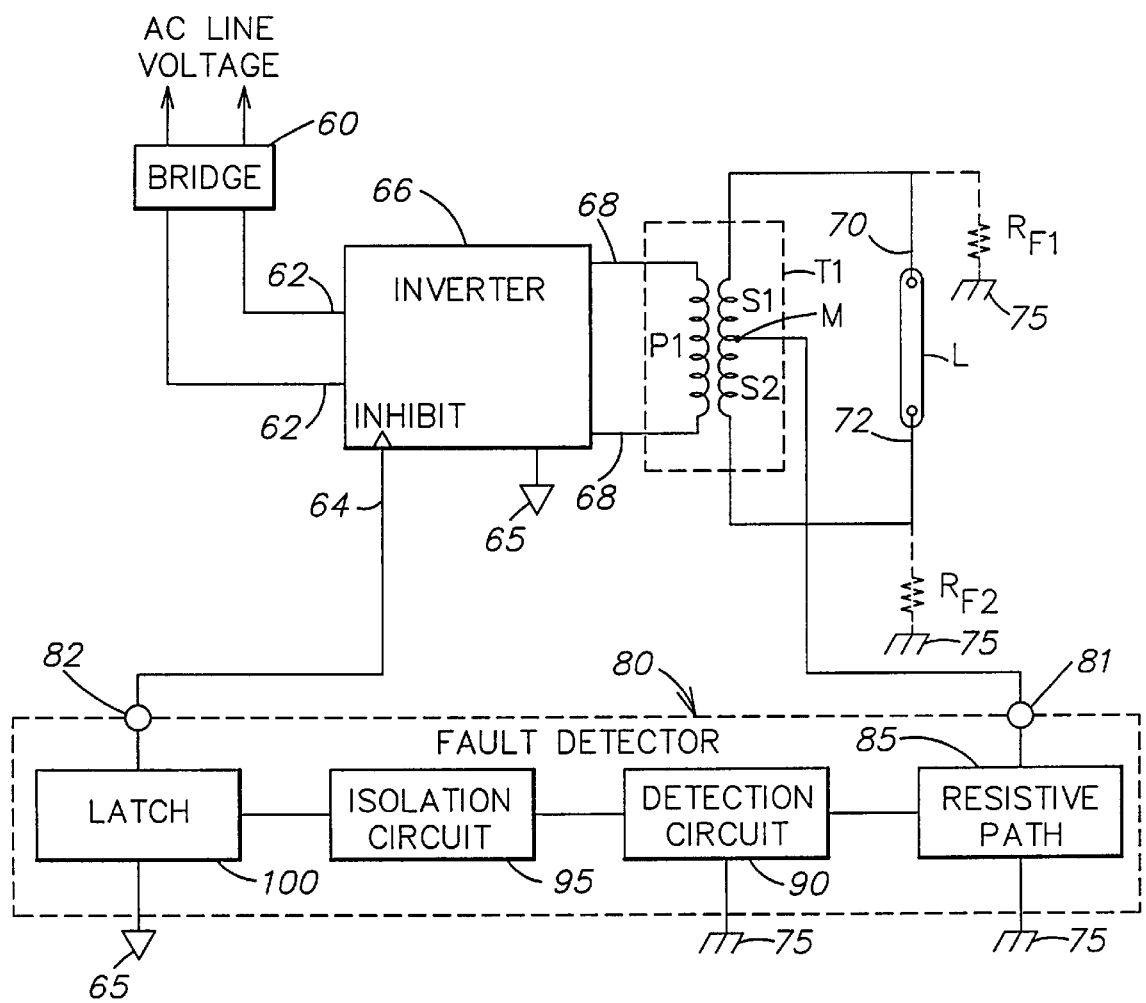
FIGS. 5 and 5A are partial circuit and partial block diagrams of two embodiments of a fault detector.
Figure 5A:
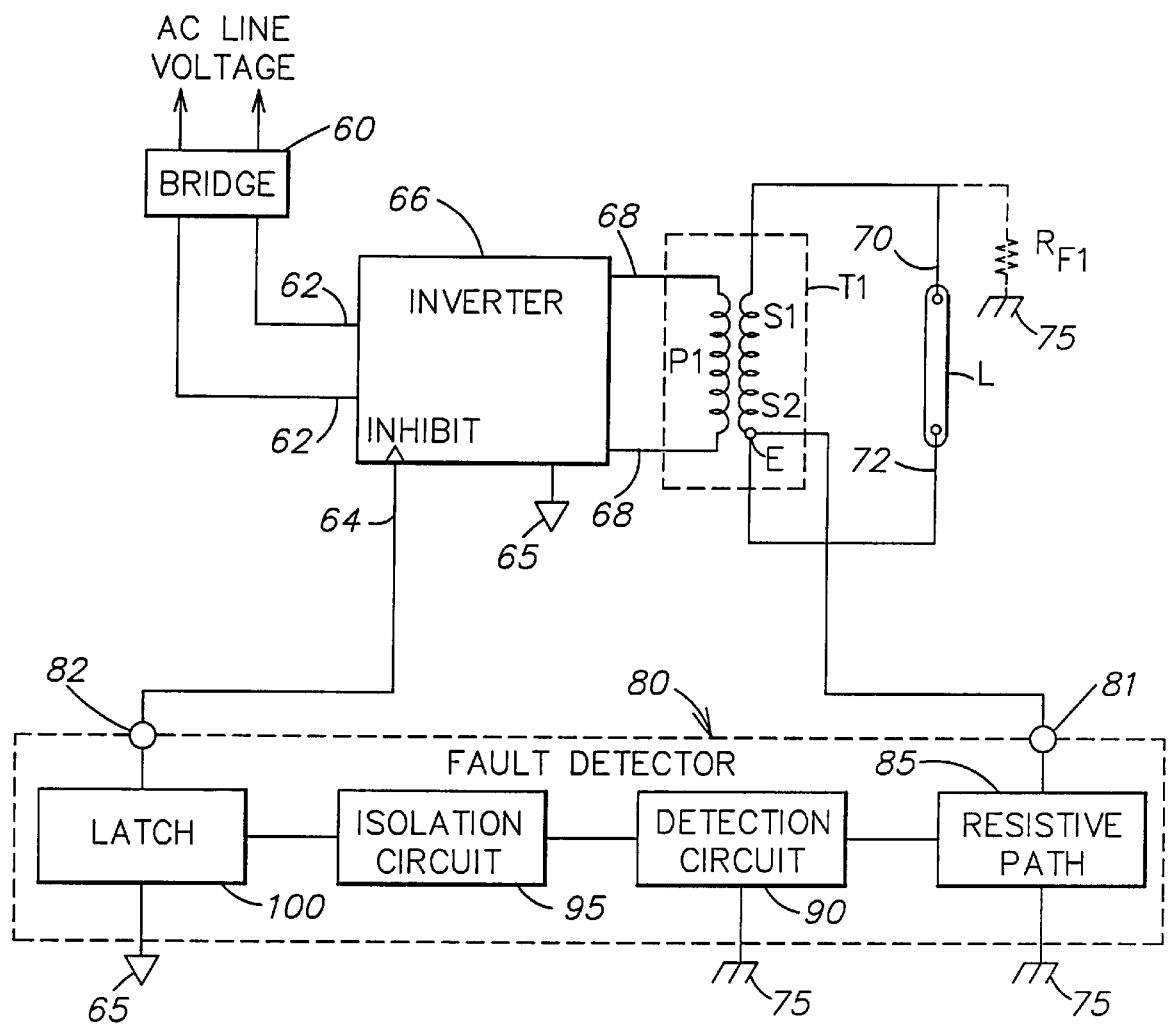

FIGS. 5 and 5A are partial circuit and partial block diagrams of the cold cathode tube power supply with two embodiments of a fault detector. Cold cathode tube L receives power from an inverter 66, which is connected to an input voltage, for example, an AC supply of 110 VAC or 220 VAC for household or commercial applications. The AC line voltage passes through a rectifier bridge 60 to provide a DC voltage supply to inverter 66 through input connectors 62. Inverter 66 may be a square wave half to full bridge type or a sinewave resonant type, or other types known in the art. In addition, inverter 66 generally operates in the 20–30 kHz range. An output 68 of inverter 66 drives the primary side (P1) of high voltage step up transformer T1, which in turn supplies high voltage to cold cathode tube L through secondary windings S1 and S2.

Ground fault detector 80 includes a resistive path, a detection circuit 90, an isolation circuit 95, and a latch 100. Resistive path 85 is connected to a node 81 and is also connected to a secondary ground 75. In the first embodiment, as shown in FIG. 5, node 81 is connected to a mid-point M of transformer T1. In the second embodiment, as shown in FIG. 5A, node 81 is connected to an end-point E of transformer T1. As defined in UL 2161, a transformer (or a power supply) has a "mid-point ground" arrangement, when it includes two separate outputs with one lead of each output (3-output leads or terminals) electrically connected to ground. A transformer (or power supply) has an "end-point ground" arrangement when it has one output winding with one end of the winding electrically connected to the ground. A transformer has an "end-point return" arrangement when it has one output winding with either winding end electrically connected to ground.

When a ground fault condition occurs on a high voltage output of high voltage transformer T1, the ground fault current flows through the system. The ground fault current paths for the ground fault currents are represented by resistors $R_{F1}$ and $R_{F2}$ connected to the secondary ground 75. Resistive path 85 receives the ground fault current as the leakage current flowing from secondary ground 75 to the mid-point M (or end-point E) of high voltage transformer T1. Voltage proportional to the ground fault current develops across resistive path 85. Detection circuit 90 senses the voltage across resistive path 85 and sends a detect signal to inverter 66. The detect signal passes through the isolation circuit 95, which operates to protect the inverter 66 from receiving the signal directly, therefore preventing undesirable current flow back from the secondary side to the primary side of transformer T1. The detect signal from the detection circuit 90 sets latch 100, which in turn sends an inhibit signal (64) to inverter 66. After receiving the inhibit signal, inverter 66 stops providing voltage to the primary side P1 of transformer T1 and in turn stops supplying power to cold cathode discharge tube L.

Figure 6:
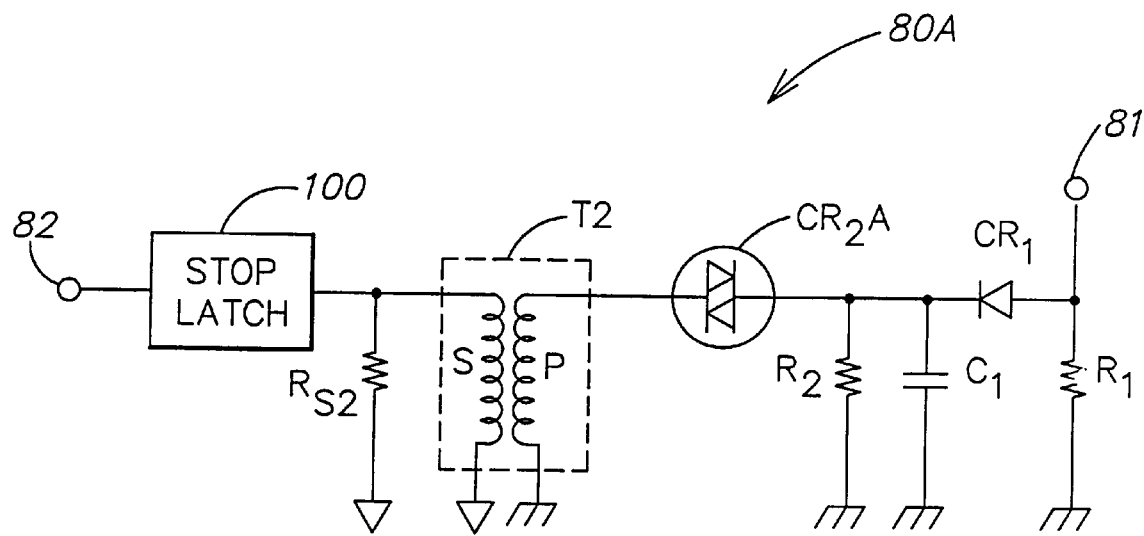
FIG. 6 is a circuit diagram showing detail of one embodiment of the fault detector of FIGS. 5 and 5A.

An embodiment of fault detector circuit 80 is shown in FIG. 6. Fault detector 80A includes a diode CR connected to a trigger diode $CR_{2A}$, pulse transformer $T_2$ and stop latch 100. Node 81 is connected to resistor $R_1$, which receives the ground fault current flowing in the system. Capacitor $C_1$ is charged with the portion of voltage $V_1$, which develops across $R_1$, while taking into account the voltage drop of diode $CR_1$. Resistor $R_2$ may have a large value, for example, 1000 Ω. Resistor $R_2$ serves to discharge the voltage of capacitor $C_1$ after the system has been turned off.

The trigger diode $CR_{2A}$ turns on abruptly when its break down voltage is reached, for example, when the threshold voltage is 13.4V. Once the threshold voltage is exceeded, the voltage charge of capacitor $C_1$ is sent to generate a pulse across the primary winding P of pulse transformer T2. Stop latch 100 is set by the secondary winding S of pulse transformer T2, which is connected to node 82. Node 82 is connected to inverter 66, which is stopped by a signal from stop latch 100 until the line voltage is removed and power is reapplied to reset the system including cathode tube L.

Figure 7:
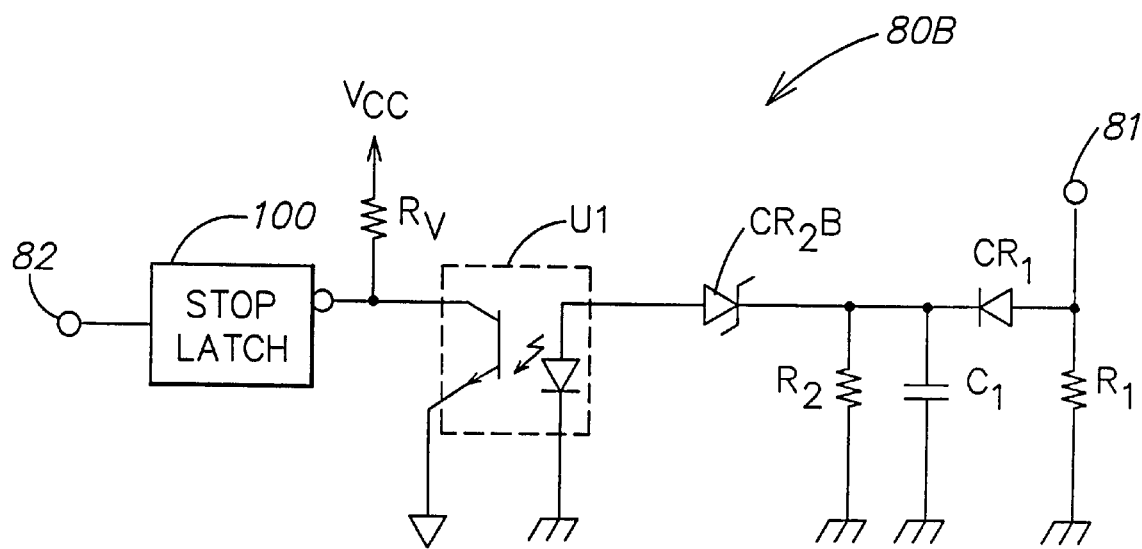
FIG. 7 is a circuit diagram showing detail of one embodiment of the fault detector of FIGS. 5 and 5A.

Another embodiment of the detection circuit 80 is shown in FIG. 7. Fault detector 80B includes similar elements as fault detector 80A of FIG. 6 except that trigger diode $CR_2A$ and transformer T2 are replaced by a Zener diode $CR_2B$ and an opto-coupler U1. Zener diode $CR_2B$ conducts current when the voltage charge of capacitor $C_1$ reaches the threshold voltage (of Zener diode $CR_2B$) plus the forward voltage drop of opto-coupler U1.

Figure 8:
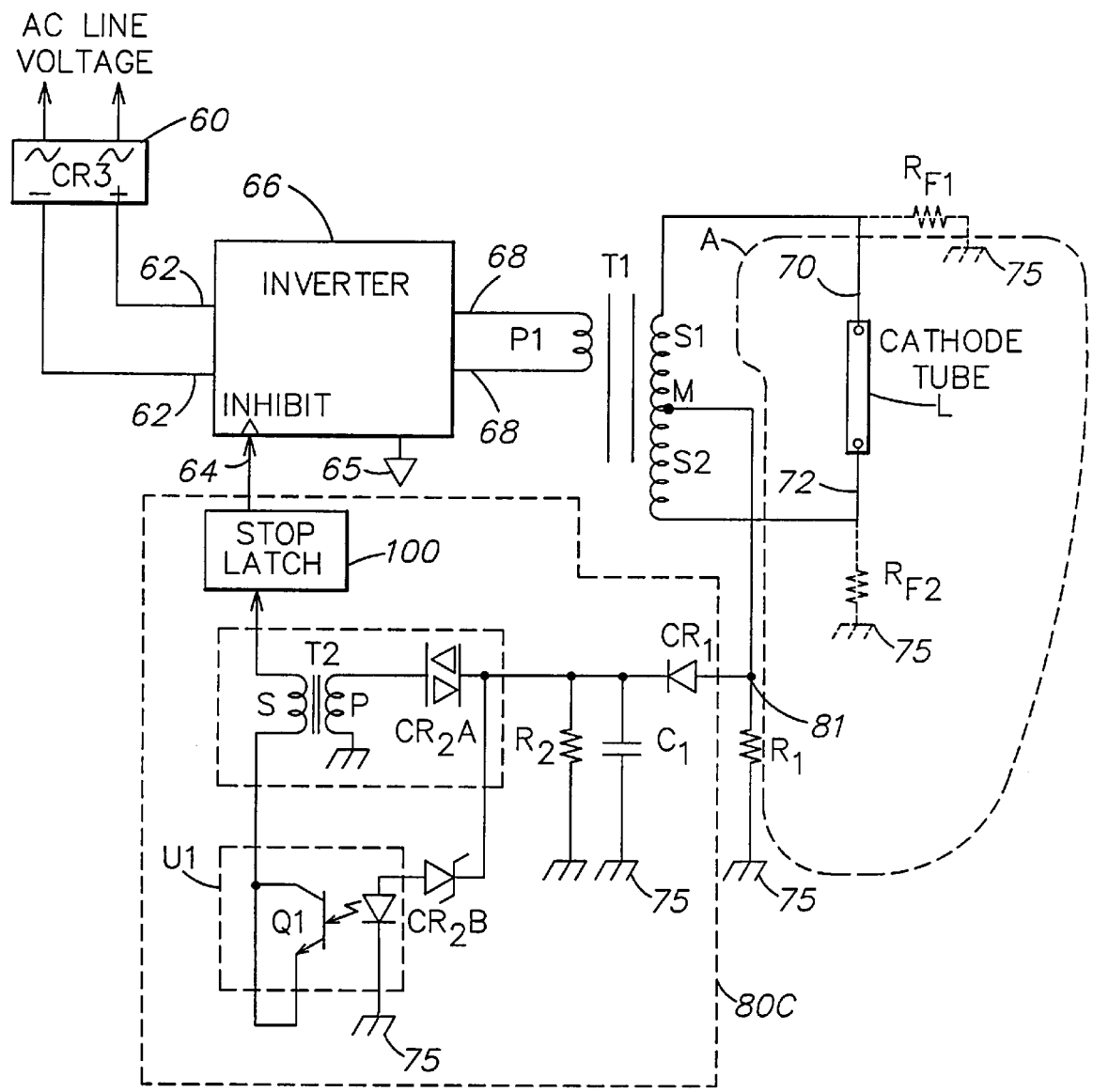
FIGS. 8 and 8A are partial circuit and partial block diagrams of detailed embodiments of the fault detector.
Figure 8A:
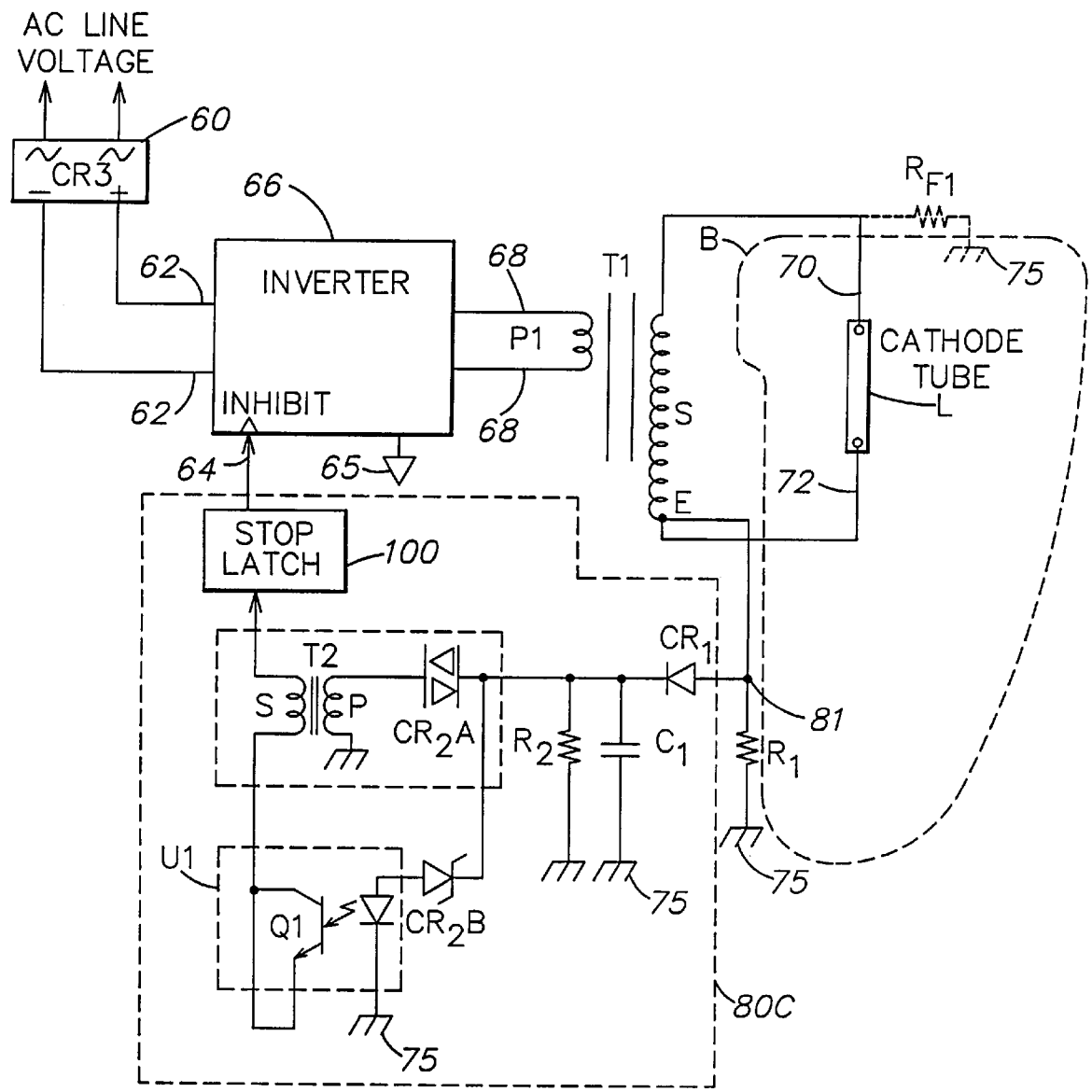

FIG. 8 is a circuit diagram that combines fault detector 80A, shown in FIG. 6, and fault detector 80B, shown in FIG. 7, with the first embodiment shown in FIG. 5 having node 81 connected to mid-point M of transformer T1. Alternatively, FIG. 8A is a circuit diagram that combines fault detector 80A, shown in FIG. 6, and fault detector 80B, shown in FIG. 7, with the second embodiment shown in FIG. 5A having node 81 connected to end-point E of transformer T1. Specifically, fault detector 80C includes trigger diode $CR_2A$, transformer T2, Zener diode $CR_{2B}$ and opto coupler U1. A dotted line A, in FIG. 8, represents the path of the ground fault current from the mid-point of transformer T1 through resistor $R_1$ to ground and to either of resistors $R_{F1}$ or $R_{F2}$. A dotted line B, in FIG. 8A, represents the path of the ground fault current from the end-point of transformer T1 through resistor $R_1$ to ground and to either of resistors $R_{F1}$ or $R_{F2}$.

Figure 9:
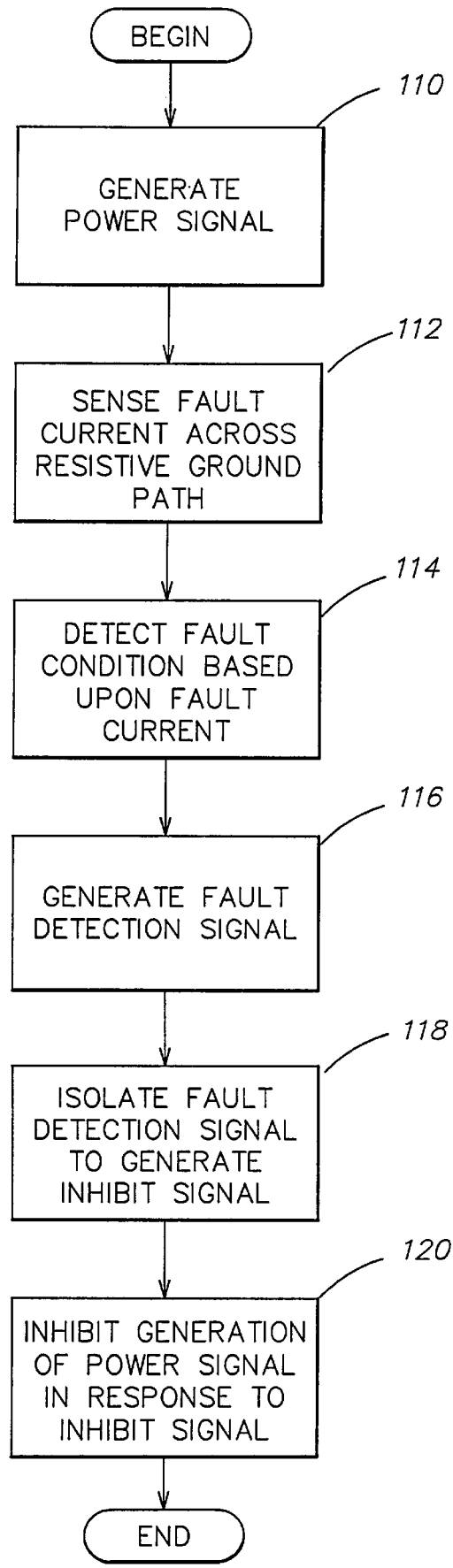
FIG. 9 is a flowchart of the fault detection process that may be performed by the circuits shown in FIGS. 5, 5A, 8 and 8A.

The operation of the systems described above in connection with FIGS. 5, 5A and 8, 8A will now be described in more detail in connection with the flowchart shown in FIG. 9. This process starts with the generation of a power signal (step 110). The power signal may be generated by passing an AC line voltage through a rectifier bridge 60 to provide DC power. DC power is supplied to inverter 66, which may be, for example, a half or full bridge square wave type or a sinewave resonant type. Inverter 66 drives the primary side P1 of the high voltage transformer T1, which supplies high voltage to the cold cathode tube L. Any fault current across a resistive ground path 85 is sensed in step 112. Any ground fault current that is present will also flow through the resistive path 85, for example, a resistor $R_1$ (FIGS. 8 and 8A). The ground fault current path is represented by resistors $R_{F1}$ and $R_{F2}$. The current flowing through the resistive path 85 is proportional to the fault current and creates a voltage drop across the resistive path. For example, if the resistive path is represented by $R_1$ which is 1000 ohms, and 10 mA rms of ground fault current flows through $R_1$, then using V=I·R the voltage across $R_1$ is 10 V rms. If the inverter 60 is a sinewave type, then the 10 Vrms results in a peak voltage of 14.1 V and capacitor $C_1$ will be charged to this peak voltage of about 13.4 V, that is, 14.1V minus the forward voltage drop across $CR_1$ of 0.7 V. The pulse amplitude will be 13.4 V stored in $C_1$, minus the voltage required to turn on diode $CR_2A$, which is approximately 1 V. Therefore, the pulse will have a voltage amplitude of approximately 12.4 V.

Detection circuit 90 detects a fault condition, in step 114, based on the voltage which develops across resistor 85. The fault detector may include for example, a trigger diode $CR_2A$, resistor $R_2$ and capacitor $C_1$, or it may include a Zener diode $CR_2B$ and an opto coupler U1 as discussed above in connection with FIGS. 6 and 7. Next, the fault detector provides a fault detection signal, step 116, indicating that a fault was detected in step 114. In step 118, isolation circuit 95, which may include transformer T2 or opto-coupler U1. For example, if transformer T2 has a one to one windings ratio, the pulse on the secondary side will also be 12.4V peak. Latch 100 inhibits the generation of a power signal in step 120. Inverter 66 remains stopped until the fault current accross the resistive path is removed and power is reapplied to reset the fault and the stop latch.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

Additional embodiments are within the following claims:

What is claimed is:

1. A ground fault detector for a cold cathode tube comprising:
   a resistive path connected to a secondary side of a high-voltage transformer providing power to a cold cathode tube, said resistive path being arranged to provide a ground fault path to ground fault current causing ground fault voltage to be developed across said ground fault path during a ground fault condition, the ground fault voltage being in phase with the ground fault current;
   a detection circuit, connected to said resistive path to receive voltage corresponding to the ground fault voltage, constructed and arranged to provide an output representing a fault detection signal upon detecting that said voltage is larger than a threshold value;
   an isolation circuit, connected to said detection circuit, constructed and arranged to isolate said fault detection signal from a primary side of said high voltage transformer; and
   a stop latch including an input connected to said isolation circuit and an output connected to a power supply arranged to supply power to said primary side of said high-voltage transformer.

2. The ground fault detector of claim 1 wherein said power supply is an inverter power supply.

3. The ground fault detector of claim 2 further including a rectifier connected to receive AC voltage and constructed to provide DC voltage to said inverter power supply.

4. The ground fault detector of claim 1 wherein said resistive path is connected to a midpoint of said secondary side.

5. The ground fault detector of claim 1 wherein said resistive path is connected to an end-point of said secondary side.

6. The ground fault detector of claim 1 wherein said resistive path includes a first resistor.

7. The ground fault detector of claim 6 wherein said detection circuit includes:
   a second resistor connected in parallel to said first resistor;
   a capacitor connected in parallel to said second resistor; and
   a trigger diode connected to said second resistor and connected to said isolation circuit.

8. The ground fault detector of claim 7 wherein said isolation circuit includes a pulse transformer connected to said stop latch and connected to said the detection circuit.

9. The ground fault detector of claim 6 wherein said detection circuit includes:
   a second resistor connected in parallel to said first resistor;
   a capacitor connected in parallel to said second resistor; and
   a Zener diode connected to said second resistor and connected to said isolation circuit.

10. The ground fault detector of claim 9 wherein said isolation circuit includes an opto coupler connected to said stop latch and connected to said detection circuit.

11. A power supply system for a cold cathode tube comprising:
    a high-voltage transformer including a primary side and a secondary side connected to a cold cathode tube;
    an inverter power supply constructed and arranged to provide power to said primary side of said high-voltage transformer;
    a resistive path connected to said secondary side and arranged to provide a ground fault path to ground fault current during a ground fault condition, said ground fault current generating voltage across said ground fault path, said voltage being in phase with said ground fault current;
    a detection circuit constructed and arranged to provide a fault detection signal upon detecting that said voltage is larger than a threshold value;
    a isolation circuit constructed and arranged to isolate said voltage from said primary side of said high voltage transformer; and
    a latch circuit constructed and arranged to inhibit said inverter power supply upon receiving a signal representing said ground fault condition.

12. The power supply system of claim 11 wherein said resistive path is connected to a end-point of said secondary side.

13. The power supply system of claim 11 wherein said isolation circuit includes an opto-coupler.

14. A method for detecting a ground fault in a power supply for a cold cathode tube including the steps of:
    generating a power signal;
    supplying said power signal to a primary side of a high-voltage transformer and receiving high voltage power by a cold cathode tube from a secondary of said high-voltage transformer;
    providing a resistive ground path for ground fault current from said secondary side of said high voltage transformer, the ground fault current creating ground fault voltage across the ground path during a ground fault condition, the ground fault voltage being in phase with the ground fault current;
    receiving said ground fault voltage generated by said ground fault current flowing across said ground fault path;
    detecting a fault condition based on said ground fault voltage being larger than a threshold voltage and generating a fault detection signal;
    isolating said fault detection signal from said primary side of said high voltage transformer and generating an inhibition signal; and
    inhibiting generation of said power signal in response to said inhibition signal.

15. The method of claim 14 wherein said providing step includes connecting said resistive ground path to a mid-point of said secondary side of said high voltage transformer.

16. The method of claim 14 wherein said providing step includes connecting said resistive ground path to an end-point of said secondary side of said high voltage transformer.

17. The method of claim 14 wherein said isolating step includes providing a pule transformer.

18. The method of claim 14 wherein said isolating step includes providing an opto coupler.

\* \* \* \* \*